(12) United States Patent
Baek

(10) Patent No.: US 9,397,715 B2
(45) Date of Patent: Jul. 19, 2016

(54) METHOD FOR DISPLAYING CONTACT INFORMATION AND ELECTRONIC DEVICE THEREOF

(71) Applicant: Samsung Electronics Co., Ltd., Suwon-si, Gyeonggi-do (KR)

(72) Inventor: In-Ho Baek, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 14/209,332

(22) Filed: Mar. 13, 2014

(65) Prior Publication Data

US 2014/0287797 A1      Sep. 25, 2014

(30) Foreign Application Priority Data

Mar. 21, 2013  (KR) .......................... 10-2013-0030449

(51) Int. Cl.
| | | |
|---|---|---|
| *H04B 1/38* | (2015.01) | |
| *H04B 1/3816* | (2015.01) | |
| *H04W 48/18* | (2009.01) | |
| *H04M 1/2745* | (2006.01) | |
| *H04W 88/06* | (2009.01) | |

(52) U.S. Cl.
CPC ....... *H04B 1/3816* (2013.01); *H04M 1/274516* (2013.01); *H04W 48/18* (2013.01); *H04W 88/06* (2013.01)

(58) Field of Classification Search
USPC ........... 455/406–407, 445, 433, 456.6, 550.1, 455/556.1, 558
See application file for complete search history.

(56) References Cited

U.S. PATENT DOCUMENTS

| | | | | |
|---|---|---|---|---|
| 2003/0129971 | A1* | 7/2003 | Gopikanth | H04W 48/18 455/414.1 |
| 2007/0111714 | A1 | 5/2007 | Edwards | |
| 2007/0184858 | A1* | 8/2007 | Landschaft | H04W 8/183 455/466 |
| 2009/0061932 | A1 | 3/2009 | Nagarajan | |
| 2010/0009716 | A1 | 1/2010 | Lee et al. | |
| 2011/0317592 | A1* | 12/2011 | Maheshwari | H04M 1/575 370/260 |
| 2012/0021805 | A1 | 1/2012 | Hauck et al. | |
| 2013/0225239 | A1* | 8/2013 | Wu | H04W 88/06 455/558 |
| 2015/0065197 | A1* | 3/2015 | Wu | H04M 1/72519 455/558 |

FOREIGN PATENT DOCUMENTS

| | | |
|---|---|---|
| CN | 201667652 U | 12/2010 |
| CN | 102934419 A | 2/2013 |
| KR | 10-2003-0000650 A | 1/2003 |
| KR | 10-2011-0056164 A | 5/2011 |
| KR | 10-2013-0095474 A | 8/2013 |
| WO | 2008/026049 A2 | 3/2008 |
| WO | 2012/060867 A1 | 5/2012 |

* cited by examiner

*Primary Examiner* — Fayyaz Alam
(74) *Attorney, Agent, or Firm* — Jefferson IP Law, LLP

(57) ABSTRACT

A method for displaying contact information and an electronic device thereof are provided. The method for displaying the contact information in the electronic device includes the operations of confirming service provider information corresponding to displayed contact information, and displaying the confirmed service provider information together with the contact information.

19 Claims, 9 Drawing Sheets

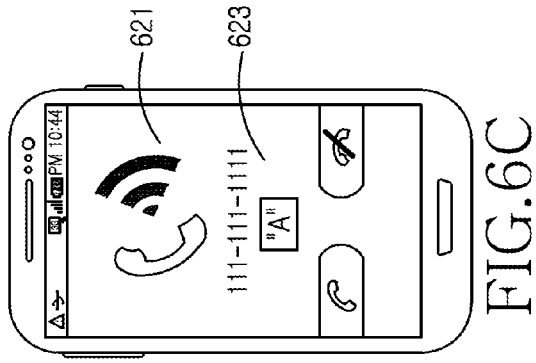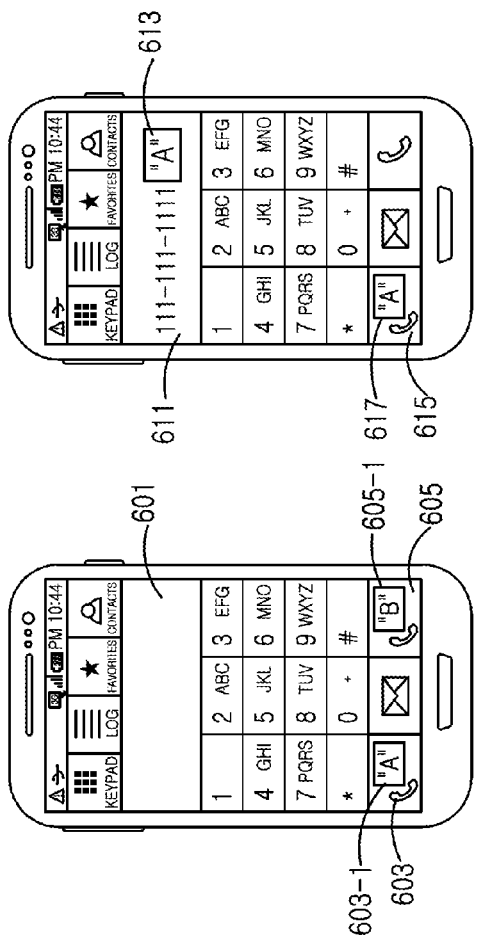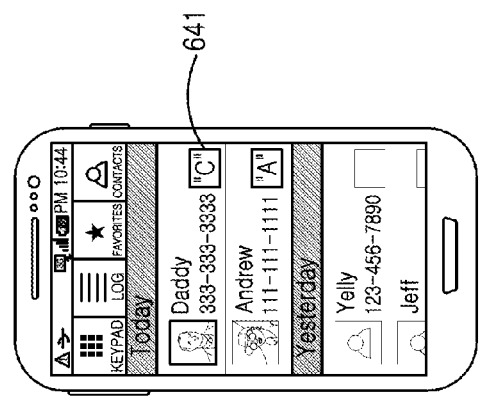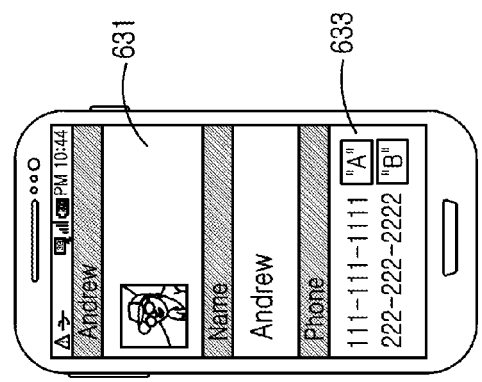

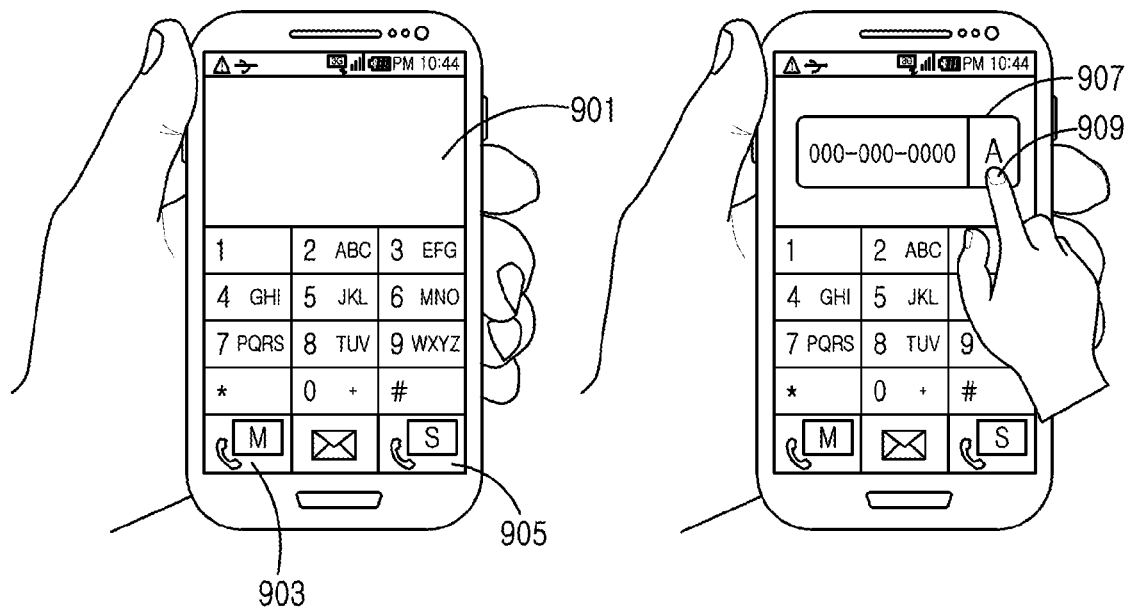
FIG.9A
FIG.9B
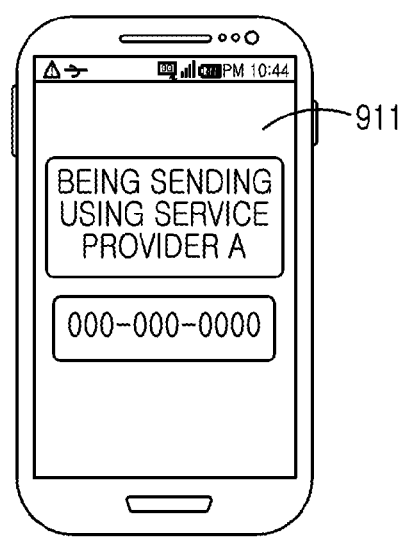
FIG.9C

METHOD FOR DISPLAYING CONTACT INFORMATION AND ELECTRONIC DEVICE THEREOF

CROSS-REFERENCE TO RELATED APPLICATION(S)

This application claims the benefit under 35 U.S.C. §119 (a) of a Korean patent application filed on Mar. 21, 2013 in the Korean Intellectual Property Office and assigned Serial number 10-2013-0030449, the entire disclosure of which is hereby incorporated by reference.

TECHNICAL FIELD

The present disclosure relates to a method for displaying contact information and an electronic device thereof.

BACKGROUND

With the recent growth of electronic devices, electronic devices that provide for wireless voice call and information exchange have become necessities to modern society. An initial reason for the popularity of electronic devices was the recognition that the electronic devices are portable and make wireless calls possible. But, with the development and advances of technologies, and the introduction of the wireless Internet, the electronic devices are satisfying user's desires by gradually increasing their utility scopes such as playing a game, remote control using short-range communication, and taking an image with an installed digital camera as well as simple telephony or schedule management.

As the electronic devices now provide multimedia services, information quantitation processed and information quantitation to display are increasing. According to this, attention is being increasingly paid to an electronic device with a touchscreen capable of improving a space utility and increasing a size of a display unit.

The touchscreen is an input/output device able to perform input/output of information in one screen. Accordingly, when using the touchscreen, the electronic device can increase a display area because it does not have a separate input device such as a keypad. For example, when employing a full touch scheme in which the touchscreen is applied to the whole screen of the electronic device, the electronic device can use the whole surface of the electronic device as a screen and increase a size of the screen.

Further, the electronic device supports a Subscriber Identity Module (SIM) card. This SIM card can be manufactured in a smart card form and be installed in the electronic device. The electronic device can combine and use a plurality of SIM cards together.

Generally, the electronic device can be provided with services of different service providers through the plurality of SIM cards.

The electronic device with the plurality of SIM cards as above should provide service using a SIM card suitable to a situation.

However, the electronic device fails to determine the SIM card suitable to the situation among the installed SIM cards in itself, and merely provides service through a SIM card selected by a user. Accordingly, there is a need for an improved apparatus and method for recommending a SIM card suitable to a call situation for a user in an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for recommending a Subscriber Identity Module (SIM) card suitable to a call situation for a user in an electronic device.

Another aspect of the present disclosure is to provide an apparatus and method for providing service provider information corresponding to displayed contact information in an electronic device.

Another aspect of the present disclosure is to provide an apparatus and method for displaying information of a SIM card matching with a service provider corresponding to displayed contact information in an electronic device.

Another aspect of the present disclosure is to provide an apparatus and method for providing network information corresponding to displayed contact information in an electronic device.

Another aspect of the present disclosure is to provide an apparatus and method for displaying information of a SIM card matching with a network of displayed contact information in an electronic device.

The above aspects are achieved by providing a method and apparatus for displaying contact information in an electronic device.

In accordance with an aspect of the present disclosure, a method for displaying contact information in an electronic device is provided. The method includes confirming service provider information corresponding to displayed contact information, and displaying the confirmed service provider information together with the contact information.

In accordance with another aspect of the present disclosure, an apparatus for displaying contact information in an electronic device is provided. The apparatus includes at least one processor configured to execute computer programs, a memory configured to store data and instructions, and at least one program stored in the memory and configured to be executable by the at least one processor. The program includes an instruction of processing to confirm service provider information corresponding to displayed contact information, and to display the confirmed service provider information together with the contact information.

In accordance with an aspect of the present disclosure, a computer-readable recording media records a program for executing the operations of confirming service provider information corresponding to displayed contact information, and displaying the confirmed service provider information together with the contact information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A, 6B, 6C, 6D, and 6E are diagrams illustrating a situation of displaying contact information in an electronic device according to an embodiment of the present disclosure;

FIGS. 9A, 9B, and 9C are diagrams illustrating a process of sending by an electronic device according to an embodiment of the present disclosure.

Throughout the drawings, it should be noted that like reference numbers are used to depict the same or similar elements, features, and structures.

DETAILED DESCRIPTION

Figure 1:
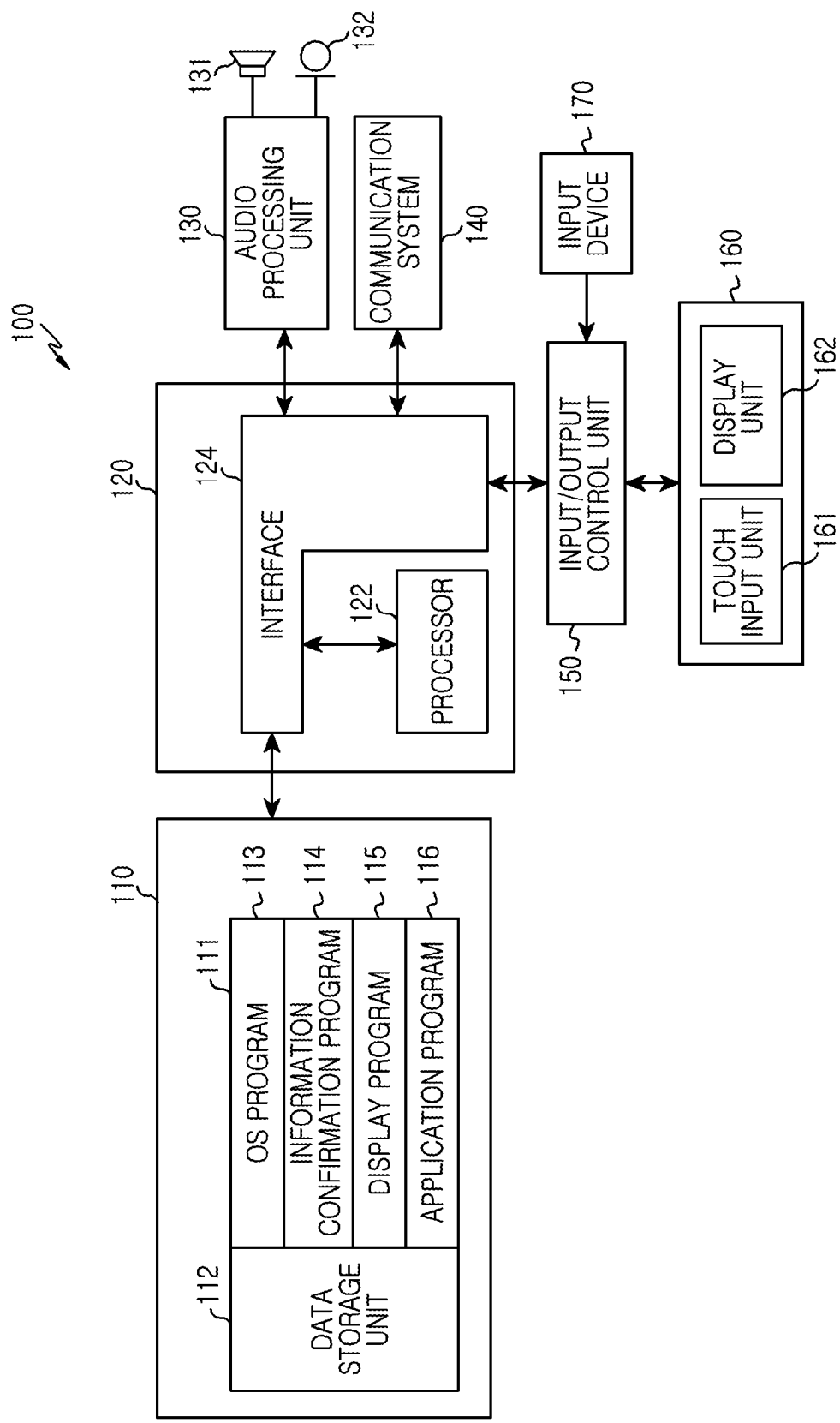
FIG. 1 is a block diagram illustrating a construction of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Below, a description will be made of an apparatus and method for, at contact information provision, providing service provider information together in an electronic device according to various embodiments of the present disclosure.

The contact information can be information of a sender or information of a receiver. Further, the service provider information can be information of a service provider providing service to a sending number or a receiving number.

Further, the electronic device can receive contact information or service provider information corresponding to the contact information from a server managing the contact information. Also, the electronic device can store the service provider information in the form of a name, icon, and the like of a service provider.

Further, the information of the sender can include a phone number of a user who has sent a call, a message, an electronic mail (e-mail), and the like, a name thereof stored in the electronic device with the phone number, and the like.

Further, the information of the receiver can include a phone number of a user who receives a call, a message, an e-mail, and the like, a name thereof stored in the electronic device with the phone number, and the like.

Further, the service provider information can be service provider information matching with a Subscriber Identity Module (SIM) card supported by the electronic device. Further, the electronic device can support a plurality of SIM cards.

Further, when providing contact information, the electronic device can provide even information of a communication network for providing service to the contact information.

When providing contact information, the electronic device can display service provider information corresponding to the displayed contact information and perform a receiving process or a sending process through the same service provider as a service provider of a counterpart user. Accordingly, the electronic device can reduce a communication cost as compared to when performing the receiving process or the sending process through other service providers.

For another example, at the time of contact information provision, the electronic device can display network information corresponding to displayed contact information and perform a receiving process or a sending process through the same network as that of a counterpart user. Accordingly, the electronic device can reduce a communication cost as compared to when performing the receiving process or the sending process through other networks.

The electronic device can be a portable electronic device, or can be a device such as a portable terminal, a mobile terminal, a media player, a tablet computer, a handheld computer, a Personal Digital Assistant (PDA), and the like. Also, the electronic device may be any portable electronic device including a device combining two or more functions among these devices.

FIG. 1 illustrates a construction of an electronic device according to an embodiment the present disclosure.

Referring to FIG. 1, the electronic device 100 includes a memory 110, a processor unit 120, an audio processing unit 130, a communication system 140, an input/output control unit 150, a touchscreen 160, and an input device 170. Here, at least one of the above-mentioned constructions can exist in plural. According to one example, the electronic device 100 can include a plurality of memories or a plurality of communication systems.

The memory 110 can include a program storage unit 111 storing a program for controlling the operation of the electronic device 100 or a data storage unit 112 storing data generated during program execution. For example, the data storage unit 112 can store various updateable storage data such as a phone book, a sending message or a receiving message, and can store contact information, and service provider information or network information per contact information.

According to various embodiments, the data storage unit 112 can store a method of displaying service provider information or network information dependent on displayed contact information.

Also, the program storage unit 111 can include an Operating System (OS) program 113, an information confirmation program 114, a display program 115, or at least one application program 116. Here, the programs stored in the program storage unit 111 are sets of instructions, and may be expressed as instruction sets.

The OS program 113 can include various software constituent elements controlling general system operation. This control of the general system operation can represent, for example, memory management and control, storage hardware (device) control and management, power control and management, and the like. The OS program 113 can perform a function of communication between various hardware (devices) and program constituent elements (modules).

The information confirmation program 114 can include various software constituent elements for confirming service provider information or network information corresponding to displayed contact information.

At this time, the information confirmation program 114 can confirm service provider information or network information corresponding to displayed contact information in a situation of receiving or sending a call, a message, and the like, a situation of executing a contact function, a situation of providing a reception/sending history, and the like.

According to various embodiments, the information confirmation program 114 can confirm the installation or non-installation of a SIM card matching with service provider information or network information corresponding to displayed contact information.

The display program 115 can include various software constituent elements for providing and displaying a graphic on the touchscreen 160. The term of 'graphics' can include a text, a web page, an icon, a digital image, a video, an animation, and the like.

Further, the display program 115 can include various software constituent elements related to a user interface.

According to various embodiments, the display program 115 can display contact information and service provider information or network information corresponding to the contact information, and display information notifying of the existence of a SIM card of a service provider matching with the service provider information or network information corresponding to the displayed contact information.

According to various embodiments, the display program 115 can display information notifying that the matched SIM card of the service provider exists around the displayed contact information.

According to various embodiments, the display program 115 can display information notifying that the matched SIM card of the service provider exists in a sending menu.

According to various embodiments, the display program 115 can highlight the existence of service provider information corresponding to contact information by applying a highlight such as a flickering effect, a vibration effect, and the like to the service provider information.

The application program 116 can include a software constituent element for at least one application program installed in the electronic device 100. The application program 116 can include a program of confirming service provider information or network information corresponding to displayed contact information and displaying information notifying of the existence of a SIM card of a service provider matching with the service provider information or network information.

This means that one application can provide a function of providing service provider information or network information corresponding to contact information as above.

According to various embodiments, the programs included in the program storage unit 111 can be operated by hardware constructions. According to one embodiment, the electronic device 100 can include an information confirmation module, a display module, and the like.

The processor unit 120 can include at least one processor 122 and an interface 124. Here, the processor 122 or the interface 124 can be integrated as at least one integrated circuit or be implemented as separate constituent elements.

The interface 124 can perform a role of a memory interface controlling access of the processor 122 and the memory 110.

Further, the interface 124 can perform a role of a peripheral interface controlling connection of the processor 122 with a peripheral input/output device of the electronic device 100.

The processor 122 can control the electronic device 100 to provide information of a SIM card, which matches with service provider information or network information corresponding to displayed contact information, using at least one software program.

At this time, the processor 122 can control to execute at least one program stored in the memory 110 and perform a function corresponding to the program. For example, the processor 122 can include a graphical processor for displaying contact information, and displaying information about a SIM card matching with service provider information or network information corresponding to the displayed contact information. This graphical processor can confirm service provider information for a receiver phone number and a sender phone number, and apply a specific effect to a sending menu of a SIM card matching with the confirmed service provider information.

According to various embodiments, a function of displaying contact information of the electronic device 100 and service provider information or network information corresponding to the contact information can be performed using software such as the program stored in the memory 110, or hardware such as the processor.

The audio processing unit 130 can provide an audio interface between a user and the electronic device 100 through a speaker 131 and a microphone 132.

The communication system 140 can perform a communication function for voice communication and data communication of the electronic device 100. The communication system 140 may be divided into a plurality of communication sub modules supporting different communication networks. For example, the communication network can include, although not limited to, a Global System for Mobile Communication (GSM) network, an Enhanced Data GSM Environment (EDGE) network, a Code Division Multiple Access (CDMA) network, a Wireless-Code Division Multiple Access (W-CDMA) network, a Long Term Evolution (LTE) network, an Orthogonal Frequency Division Multiple Access (OFDMA) network, a Wireless Local Area Network (WLAN), a Bluetooth network, Near Field Communication (NFC), and the like.

The input/output control unit 150 can provide an interface between the interface 124 and an input/output device such as the touchscreen 160, the input device 170, or the like.

The touchscreen 160, which is an input/output device performing output of information or input of information, can include a touch input unit 161 and a display unit 162.

The touch input unit 161 can provide touch information, which is sensed through a touch panel, to the processor unit 120 through the input/output control unit 150. At this time, the touch input unit 161 is for changing the touch information into an instruction structure such as touchdown, touch move, or touch up and providing the instruction structure to the processor unit 120. The touch input unit 161 can generate input data for contact information and service provider information or network information corresponding to the contact information. Further, the touch input unit 161 can generate input data for sending through a SIM card matching with a service provider or network of displayed contact information.

The display unit 162 can display status information of the electronic device 100, a character input by a user, a moving picture or still picture, and the like. For example, the display unit 162 can display an input process for contact information and service provider information or network information corresponding to the contact information. Further, the display unit 162 can display information of a SIM card matching with a service provider or network of displayed contact information.

The input device 170 can provide input data, which is generated by user's selection, to the processor unit 120 through the input/output control unit 150. For example, the input device 170 can include only a control button for control of the electronic device 100. For another example, the input device 170 can generate input data for contact information and service provider information or network information corresponding to the contact information. Further, the touch input unit 161 can generate input data for sending through a SIM card matching with a service provider or network of displayed contact information.

Although not illustrated, the electronic device 100 can further include constituent elements for providing supplementary functions such as a broadcast receiving module for broadcasting reception, a digital sound source playing module such as an MPEG Audio Layer-3 (MP3) module, a short-range wireless communication module for short-range wireless communication, an image sensor for image data acquisition, a proximity sensor module for proximity sensing, or the like, and software for operations thereof.

According to various embodiments, the electronic device for displaying contact information includes at least one processor, a memory, and at least one program stored in the memory and configured to be executable by the at least one processor. The program can include an instruction of processing to confirm service provider information corresponding to displayed contact information and display the confirmed service provider information together with the contact information.

According to various embodiments, the program can include an instruction of, if an input for the displayed service provider information is sensed, processing to attempt to send using a SIM card matching with the input service provider information.

According to various embodiments, the program can include an instruction of processing to add the confirmed service provider information to a sending menu for the matched SIM card.

According to various embodiments, the program can include an instruction of processing to apply information about the SIM card matching with the confirmed service provider information.

According to various embodiments, the program can include an instruction of processing to confirm service provider information corresponding to displayed contact information by confirming previously stored service provider information per contact information. According to various embodiments, the program can include an instruction of processing to receive the service provider information per contact information from a server managing the service provider information or receive the service provider information per contact information from a user.

According to various embodiments, the program can include an instruction of processing to confirm and display network information corresponding to displayed contact information.

According to various embodiments, the program can include an instruction of, if an input for the displayed network information is sensed, processing to attempt to send using a SIM card matching with the input network information.

According to various embodiments, the program can include an instruction of processing to add the confirmed network information to a sending menu for the matched SIM card.

Figure 2:
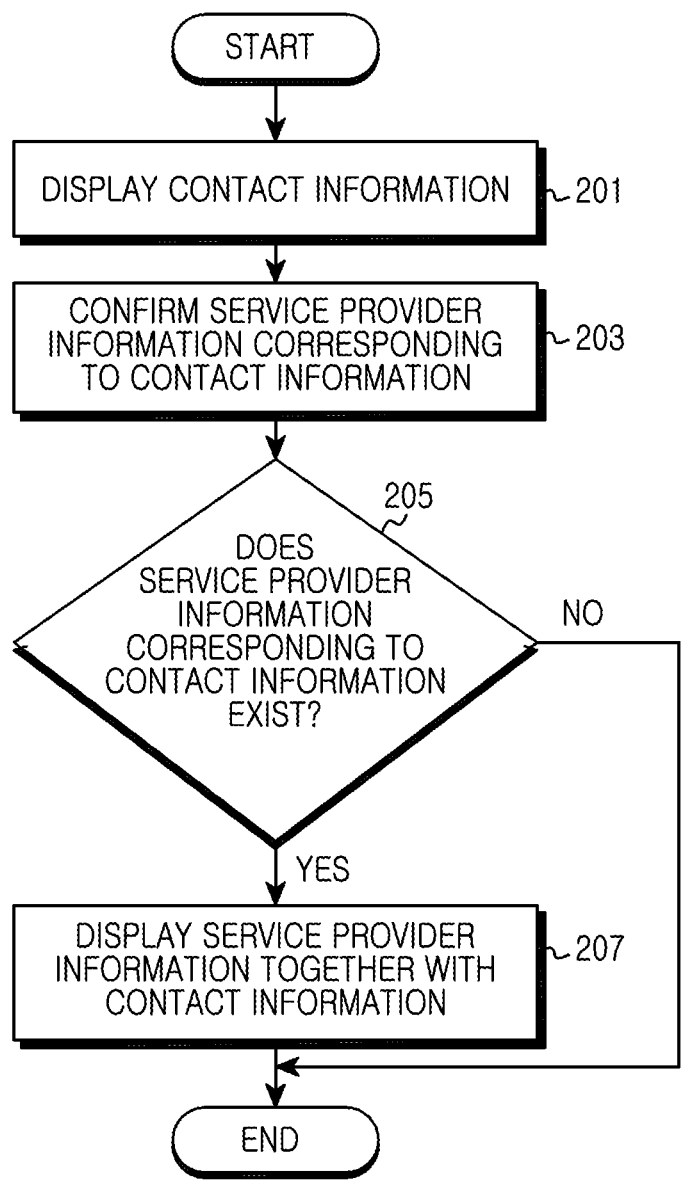
FIG. 2 is a flowchart illustrating a process of displaying contact information in an electronic device according to an embodiment of the present disclosure.

FIG. 2 is a flowchart illustrating a process of displaying contact information in an electronic device according to an embodiment of the present disclosure.

Referring to FIG. 2, when displaying contact information, the electronic device can display service provider information corresponding to the displayed contact information together.

Here, the contact information can be information of a sender or receiver (e.g., a phone number, a name, and the like of the sender or receiver). Further, the service provider information can be information of a communication service provider providing service to a sending number or receiving number.

According to various embodiments, the electronic device can receive contact information or service provider information corresponding to the contact information from a server managing the contact information. At this time, the electronic device can receive contact information or service provider information corresponding to the contact information from a server managing a service subscriber. In a different method, the electronic device can receive contact information or service provider information corresponding to the contact information from a server to which users register their own contact information and service provider information.

According to various embodiments, the electronic device can receive service provider information corresponding to contact information from a user and store the received service provider information.

According to various embodiments, the electronic device can receive and store a name, an icon, color information, and the like defined on a per-service-provider basis, as the service provider information.

In operation 201, the electronic device can display contact information. Here, the contact information can be a phone number registered to a contact function, a name of a user corresponding to the registered phone number, and the like.

According to various embodiments, displaying the contact information may occur when executing the contact function and displaying a phone number, a name, and the like of at least one user on a screen.

According to various embodiments, displaying the contact information may occur when displaying, on a screen, a phone number, a name, and the like of a counterpart user input by a user in order to send a call, a message, and the like to the counterpart user.

According to various embodiments, displaying the contact information may occur when, as receiving a call, a message, or the like, displaying on a screen a phone number, a name, and the like of a sender who has sent the call, the message, or the like.

According to various embodiments, displaying the contact information can be a situation of displaying on a screen a receiving/sending phone number, a name, and the like as recent history information about a call, a message, and the like.

Displaying the contact information can include a plurality of situations of displaying information of a user in which communication connection is possible, besides the above-mentioned situations.

After displaying the contact information, in operation 203, the electronic device can confirm service provider information corresponding to the displayed contact information. At this time, the electronic device can confirm the service provider information corresponding to the displayed contact information in previously stored contact information and service provider information.

According to various embodiments, if a phone number of a user "Andrew" is displayed, the electronic device can confirm information of a communication service provider to which the phone number of the user "Andrew" has been subscribed.

In operation 205, the electronic device can determine if service provider information corresponding to contact information exists and the electronic device can perform an operation according to the determination result.

According to various embodiments, if the service provider information corresponding to the displayed contact information does not exist, the electronic device can perform a general operation of displaying the contact information.

If the service provider information corresponding to the displayed contact information exists, in operation 207, the electronic device can display the service provider information corresponding to the contact information together with the contact information.

According to various embodiments, the electronic device can display information notifying of the existence of the service provider information corresponding to the displayed contact information according to the following embodiments.

The electronic device can notify of the existence of service provider information corresponding to contact information using an icon, a name, a color, and the like capable of distinguishing service providers. Further, the electronic device can display the information capable of distinguishing the service providers in a part of a display region. For one example, the electronic device can include the information capable of distinguishing the service providers in a sending menu. This can mean applying an effect to the sending menu matching with the same service provider as a service provider corresponding to the displayed contact information, in a predefined method.

For another example, the electronic device can display the information capable of distinguishing the service providers around the displayed contact information.

Further, the electronic device can highlight the existence of service provider information corresponding to contact information by applying a highlight such as a flickering effect, a vibration effect, and the like to the information capable of distinguishing the service providers.

The electronic device can obtain at least the following effects by displaying service provider information together with contact information.

First, the electronic device with a plurality of SIM cards can recommend a SIM card to use at the time of sending to displayed contact information. In more detail, the displayed contact information can be information of a receiver, and the electronic device can provide information of a service provider used by the receiver and send data through the same service provider as the service provider used by the receiver.

Also, the electronic device can determine the acceptance or non-acceptance of a received call. In more detail, the displayed contact information can be information of a sender, and the electronic device can receive a call when a service provider of the electronic device and a service provider of the sender are the same as each other. Undoubtedly, the sending operation and the receiving operation are carried out according to user's determination, and the electronic device can provide the contact information and the service provider information together so as to help the user's determination.

One reason for providing this function is because an excessive communication cost can be incurred when the electronic device performs the sending operation or the receiving operation using different service providers than when the electronic device performs the sending operation or the receiving operation using the same service provider. As displaying the contact information and the service provider information as above, a user of the electronic device can perform the receiving operation or the sending operation through the same service provider as a service provider corresponding to the contact information.

Figure 3:
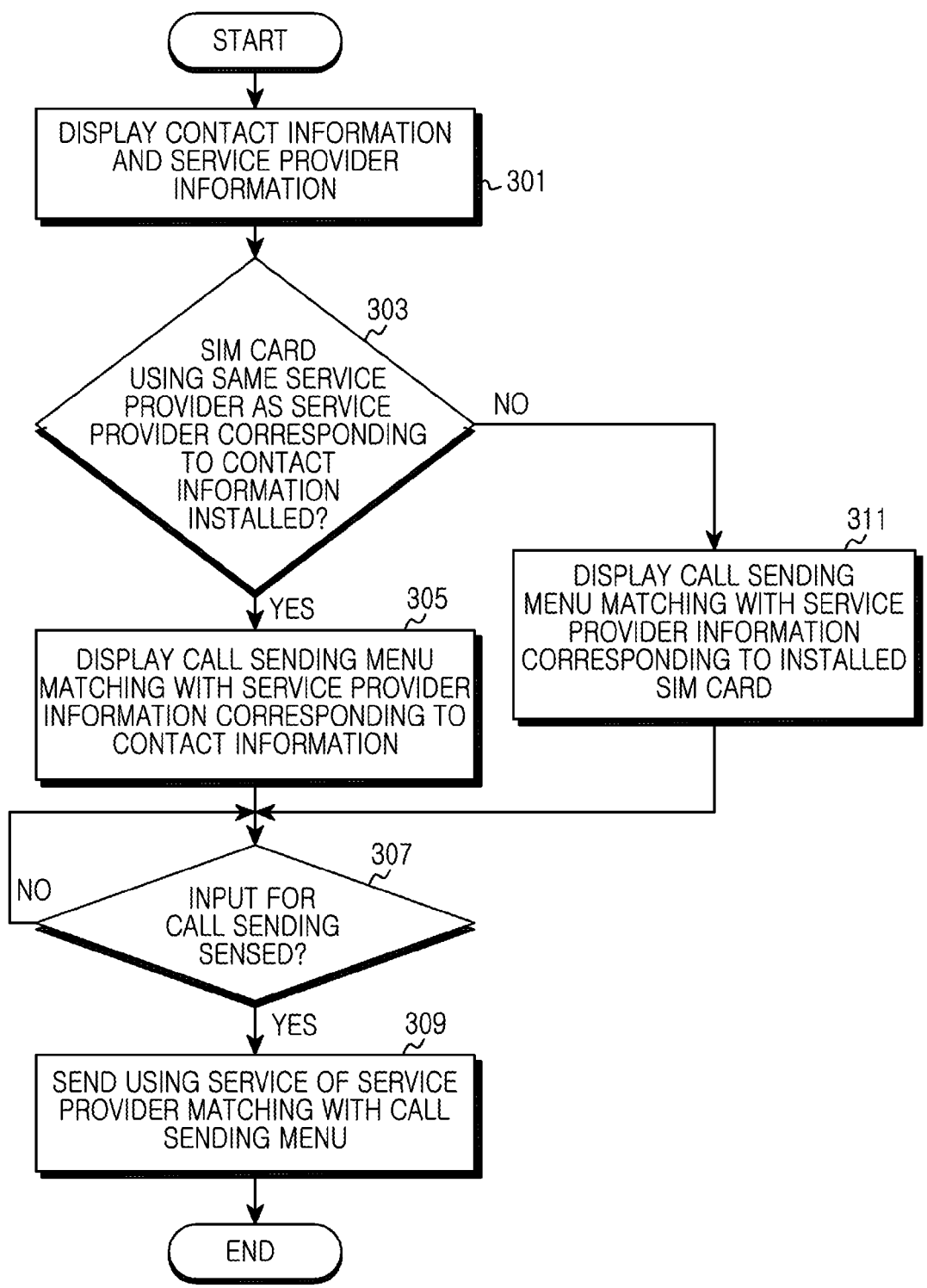
FIG. 3 is a flowchart illustrating a process of sending using service provider information in an electronic device according to an embodiment of the present disclosure.

FIG. 3 is a flowchart illustrating a process of sending using service provider information in an electronic device according to an embodiment of the present disclosure.

Referring to FIG. 3, the electronic device can store contact information, and information of a service provider providing service to the contact information.

When displaying contact information, in operation 301, the electronic device can display the contact information, and information of a service provider providing service to the contact information.

The electronic device can display even the service provider information together in a situation of executing a contact function and displaying a phone number, a name, and the like of at least one user.

According to various embodiments, the electronic device can display even the service provider information together in a situation of displaying on a screen a phone number, a name, and the like of a counterpart user input by a user so as to send a call, a message, and the like to the counterpart user.

According to various embodiments, the electronic device can display even the service provider information together in a situation of, as receiving a call, a message, or the like, displaying on a screen a phone number, a name, and the like of a sender who has sent the call, the message or the like.

According to various embodiments, the electronic device can display even the service provider information together in a situation of displaying on a screen a recent receiving/sending phone number, name, and the like for a call, a message, and the like.

The electronic device can provide service provider information such that it can perform a receiving operation or a sending operation through the same service provider, because an excessive communication cost can be incurred when the electronic device performs the sending operation or the receiving operation using different service providers than when the electronic device performs the sending operation or the receiving operation using the same service provider.

In operation 303, the electronic device can determine if a SIM card using the same service provider as a service provider corresponding to the displayed contact information has been installed in the electronic device.

Here, the electronic device can support a plurality of SIM cards. This can mean that the electronic device can use services through a plurality of networks corresponding to the plurality of SIM cards.

If the SIM card using the same service provider as the service provider corresponding to the displayed contact information has not been installed, in operation 311, the electronic device can display a call sending menu matching with service provider information corresponding to an installed SIM card.

According to various embodiments, in a case of supporting two SIM cards, the electronic device can display a sending menu capable of sending using the main SIM card and a sending menu capable of sending using the sub SIM card.

If the SIM card using the same service provider as the service provider corresponding to the displayed contact information has been installed, in operation 305, the electronic device can display a call sending menu matching with the service provider information corresponding to the displayed contact information.

At this time, the electronic device can add information notifying that it is the same service provider, to the call sending menu corresponding to the SIM card using the same service provider as the service provider corresponding to the displayed contact information. For one example, the electronic device can add a name, an icon, and a color capable of distinguishing service providers, and the like to the call sending menu corresponding to the SIM card using the same service provider as the service provider corresponding to the displayed contact information.

Further, the electronic device can distinguish service providers for the call sending menu by applying a highlight such as a flickering effect, a vibration effect, and the like to the call sending menu corresponding to the SIM card using the same service provider as the service provider corresponding to the displayed contact information.

That is, the electronic device can apply an effect to the call sending menu capable of sending using the same service provider as the service provider corresponding to the displayed contact information.

In operation 307, the electronic device can determine if a user's input for the sending menu for sending a call, a message, and the like to the displayed contact information is sensed.

Here, the call sending menu can be a call sending menu adding service provider information corresponding to contact information to send using the same service provider as the service provider corresponding to the displayed contact information.

If the user's input for the call sending menu is sensed, in operation 309, the electronic device can attempt to send using a service of the service provider matching with the call sending menu.

According to various embodiments, the electronic device can provide a user with information notifying that the electronic device can send through the same service provider as the service provider corresponding to the contact information. Upon receiving this information, the user can attempt to send through the same service provider as the service provider corresponding to the contact information.

Figure 4:
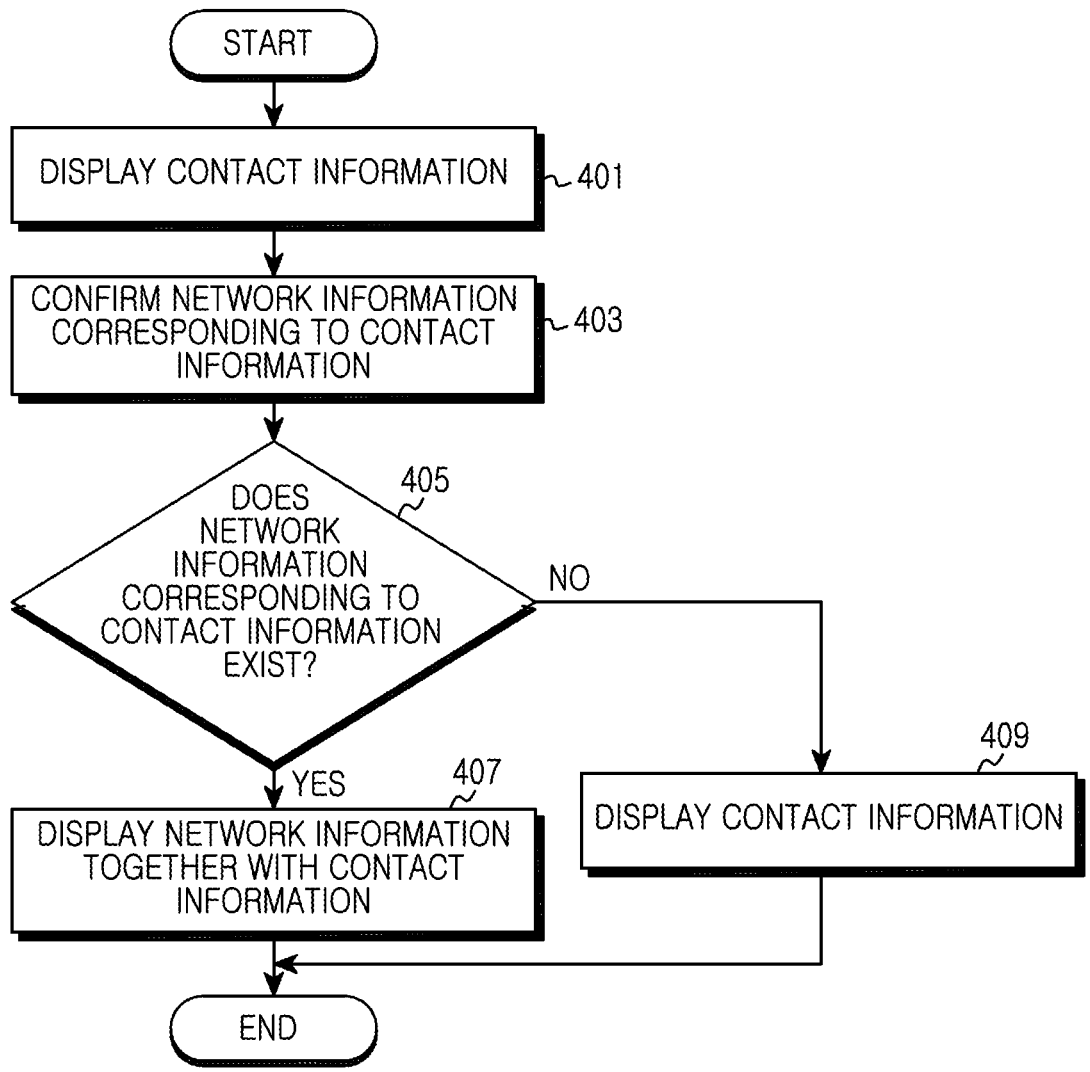
FIG. 4 is a flowchart illustrating a process of displaying contact information in an electronic device according to an embodiment of the present disclosure.

FIG. 4 is a flowchart illustrating a process of displaying contact information in an electronic device according to an embodiment of the present disclosure.

Referring to FIG. 4, when displaying contact information, the electronic device can display network information corresponding to the displayed contact information together.

Here, the contact information can be information of a sender or receiver (e.g., a phone number, a name, and the like of the sender or receiver). Further, the network information can be information of a communication network providing service to a sending number or receiving number.

According to various embodiments, the electronic device can receive contact information or network information corresponding to the contact information from a server managing the contact information. At this time, the electronic device can receive contact information or network information corresponding to the contact information from a server managing a service subscriber. This server receives information of a user subscribing to service and manages contact information per subscriber or network information corresponding to the contact information. Whenever a user subscribes to service, the server can receive information of the user subscribing to the service.

According to various embodiments, the electronic device can receive contact information or network information corresponding to the contact information from a server to which users register their own contact information and network information. This server can be a server managing multiple contact information per user, and can manage information received from a user who intends to register his/her own contact information and network information corresponding to the contact information.

According to various embodiments, the electronic device can receive contact information or network information from various external devices managing information of a user.

According to various embodiments, the electronic device can receive network information corresponding to contact information from a user and store the received network information.

According to various embodiments, the electronic device can receive and store a name, an icon, color information, and the like defined on a per-network basis, as the network information.

In operation 401, the electronic device can display contact information. Here, the contact information can be a phone number registered to a contact function, a name of a user corresponding to the registered phone number, and the like.

According to various embodiments, displaying the contact information can be a situation of executing the contact function and displaying a phone number, a name, and the like of at least one user on a screen.

According to various embodiments, displaying the contact information can be a situation of displaying on a screen a phone number, a name, and the like of a counterpart user input by a user in order to send a call, a message, and the like to the counterpart user.

According to various embodiments, displaying the contact information can be a situation of, as receiving a call, a message, or the like, displaying on a screen a phone number, a name, and the like of a sender who has sent the call, the message or the like.

According to various embodiments, displaying the contact information can be a situation of displaying on a screen a receiving/sending phone number, a name, and the like as recent history information about a call, a message, and the like.

Displaying the contact information can include a plurality of situations of displaying information of a user in which communication connection is possible, besides the above-mentioned situations.

After displaying the contact information, in operation 403, the electronic device can confirm network information corresponding to the displayed contact information. At this time, the electronic device can confirm the network information corresponding to the displayed contact information among previously stored contact information and network information. That is, if a phone number of a user "Andrew" is displayed, the electronic device can confirm network information (e.g., 3G, 4G, WiFi, and the like) used by the user "Andrew".

In operation 405, the electronic device can determine if network information corresponding to contact information exists and perform an operation according to the determination result.

If the network information corresponding to the displayed contact information does not exist, in operation 409, the electronic device can perform a general operation of displaying the contact information.

If the network information corresponding to the displayed contact information exists, in operation 407, the electronic device can display the network information corresponding to the contact information together with the contact information.

At this time, the electronic device can display information notifying of the existence of the network information corresponding to the displayed contact information according to the following embodiments.

The electronic device can notify of the existence of network information corresponding to contact information using an icon, a name, a color, and the like capable of distinguishing networks. According to various embodiments, the electronic device can display information capable of distinguishing the networks in a part of a display region. For one example, the electronic device can include the information capable of distinguishing the networks in a sending menu. This can mean applying an effect to the sending menu matching with the same network as a network corresponding to the displayed contact information.

For another example, the electronic device can display the information capable of distinguishing the networks around the displayed contact information.

According to various embodiments, the electronic device can highlight the existence of network information corresponding to contact information by applying a highlight such as a flickering effect, a vibration effect, and the like to the information capable of distinguishing the networks.

The electronic device can obtain at least the following effects by displaying network information together with contact information.

First, the electronic device with a plurality of SIM cards can recommend a SIM card to use at the time of sending to displayed contact information. In more detail, the displayed contact information can be information of a receiver, and the electronic device can provide information of a network used by the receiver and send through the same network as the network used by the receiver.

Also, the electronic device can determine the acceptance or non-acceptance of a received call. In more detail, the displayed contact information can be information of a sender, and the electronic device can receive a call when a network of the electronic device and a network of the sender are the same as each other. Undoubtedly, the sending operation and the receiving operation are carried out according to the user's determination, and the electronic device can provide network information of a counterpart user together with contact information of the counterpart user so as to help the user's determination.

One reason for providing this function is because an excessive communication cost can be incurred when the electronic device performs the sending operation or the receiving operation using different networks than when the electronic device performs the sending operation or the receiving operation using the same network. As displaying the contact information and the network information as above, a user of the electronic device can perform the receiving operation or the sending operation through the same network as a network corresponding to the contact information.

Figure 5:
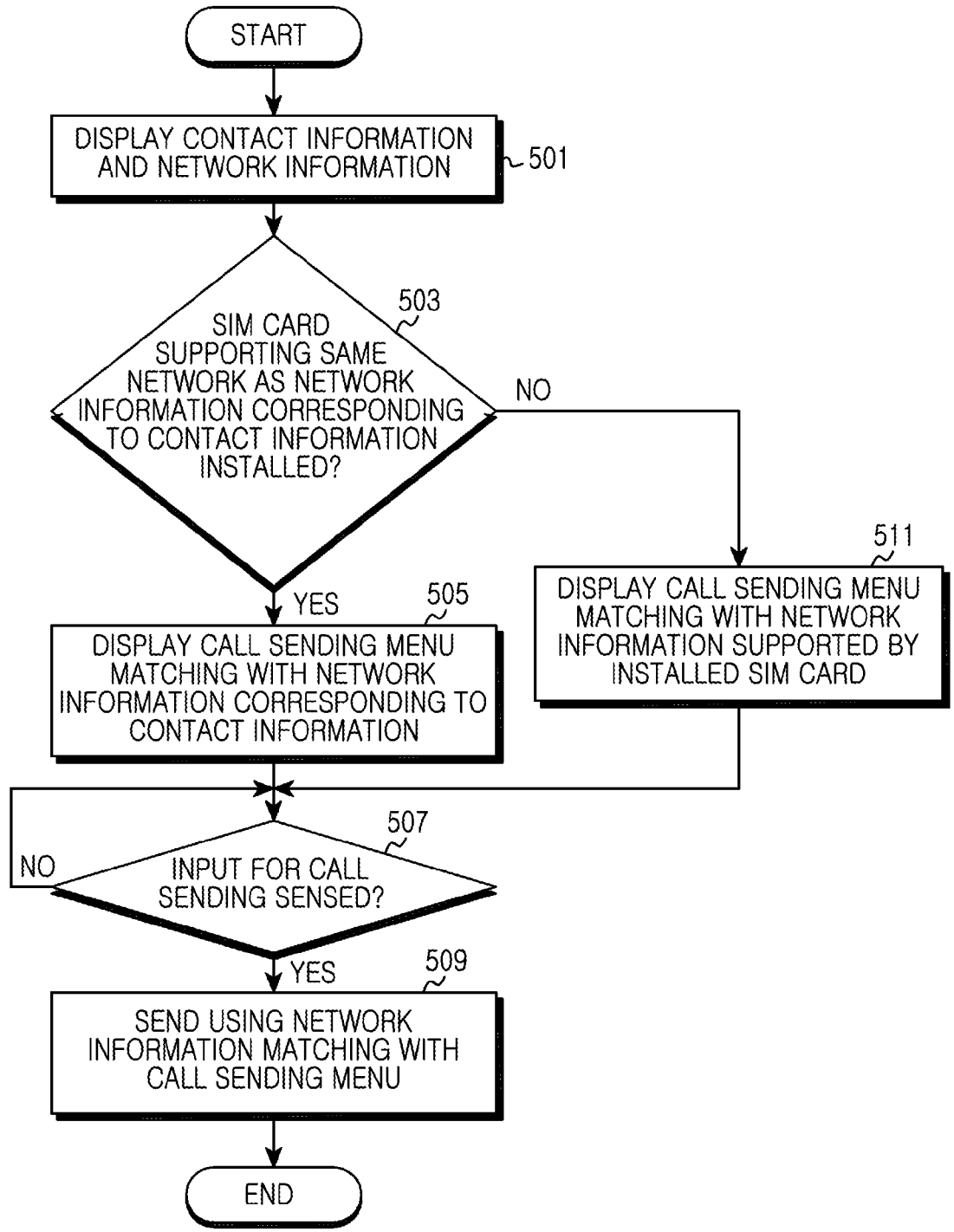
FIG. 5 is a flowchart illustrating a process of sending using network information in an electronic device according to an embodiment of the present disclosure.

FIG. 5 is a flowchart illustrating a process of sending using network information in an electronic device according to an embodiment of the present disclosure.

Referring to FIG. 5, the electronic device can store contact information, and information of a network providing service to the contact information.

When displaying contact information, in operation 501, the electronic device can display the contact information, and information of a network providing service to the contact information.

The electronic device can display the network information corresponding to the displayed contact information together in a situation of executing a contact function and displaying a phone number, a name, and the like of at least one user.

According to various embodiments, the electronic device can display the network information corresponding to the displayed contact information in a situation of displaying on a screen a phone number, a name, and the like of a counterpart user input by a user so as to send a call, a message, and the like to the counterpart user.

According to various embodiments, the electronic device can display the network information corresponding to the displayed contact information in a situation of, as receiving a call, a message, or the like, displaying on a screen a phone number, a name, and the like of a sender who has sent the call, the message, or the like.

According to various embodiments, the electronic device can display the network information corresponding to the displayed contact information in a situation of displaying on a screen a recent receiving/sending phone number, name, and the like for a call, a message, and the like.

The electronic device can provide network information corresponding to contact information such that it can perform a receiving operation or a sending operation through the same network, because an excessive communication cost can be incurred when the electronic device performs the sending operation or the receiving operation using different networks than when the electronic device performs the sending operation or the receiving operation using the same network.

In operation 503, the electronic device can determine if a SIM card using the same network as a network corresponding to the displayed contact information has been installed in the electronic device.

Here, the electronic device can support a plurality of SIM cards. That is, the electronic device can use services through a plurality of networks corresponding to the plurality of SIM cards.

If the SIM card using the same network as the network corresponding to the displayed contact information has not been installed, in operation 511, the electronic device can display a call sending menu matching with network information corresponding to an installed SIM card.

According to various embodiments, in a case of supporting two SIM cards, the electronic device can display a sending menu capable of sending using the main SIM card and a sending menu capable of sending using the sub SIM card.

If the SIM card using the same network as the network corresponding to the displayed contact information has been installed, in operation 505, the electronic device can display a call sending menu matching with the network information corresponding to the displayed contact information.

At this time, the electronic device can add information notifying that it is the same network to the call sending menu corresponding to the SIM card using the same network as the network corresponding to the displayed contact information. For one example, the electronic device can add a name, an icon, and a color capable of distinguishing networks, to the call sending menu corresponding to the SIM card using the same network as the network corresponding to the displayed contact information.

According to various embodiments, the electronic device can distinguish networks for the call sending menu by applying a highlight such as a flickering effect, a vibration effect, and the like to the call sending menu corresponding to the SIM card using the same network as the network corresponding to the displayed contact information.

That is, the electronic device can apply an effect to the call sending menu capable of sending using the same network as the network corresponding to the displayed contact information.

In operation 507, the electronic device can determine if a user's input for the sending menu for sending a call, a message, and the like to the displayed contact information is sensed.

Here, the call sending menu can be a call sending menu capable of sending using the same network as the network corresponding to the displayed contact information.

If the user's input for the call sending menu is sensed, in operation 509, the electronic device can attempt to send using the network matching with the call sending menu.

According to various embodiments, the electronic device can provide a user with information notifying that the electronic device can send through the same network as the network corresponding to the contact information. As receiving this information, the user can attempt to send through the same network as the network corresponding to the contact information.

FIGS. 6A to 6E are diagrams illustrating a situation of displaying contact information in an electronic device according to an embodiment of the present disclosure.

Referring to FIGS. 6A to 6E, when a contact function is executed, the electronic device can display contact information including a phone number, a name, and the like of at least one user.

According to various embodiments, the electronic device can display contact information including a phone number, a name, and the like of a counterpart user input by a user in order to send a call, a message, and the like to the counterpart user.

According to various embodiments, as receiving a call, a message, or the like, the electronic device can display contact information including a phone number, a name, and the like of a sender who has sent the call, the message, or the like.

According to various embodiments, the electronic device can display contact information including a receiving/sending phone number, a name, and the like as recent history information about a call, a message, and the like.

According to various embodiments, when displaying contact information, the electronic device can display information of a service provider providing service to the contact information.

This means that the electronic device can provide the information of the service provider to which a counterpart user has been subscribed, together with the contact information.

According to various embodiments, the electronic device can support a plurality of SIM cards. Here, supporting the plurality of SIM may indicate that the electronic device can receive services through different service providers.

According to various embodiments, in FIG. 6A, an electronic device 601 supports two SIM cards. The one SIM card can be a SIM card supporting a communication company "A", and the other SIM card can be a SIM card supporting a communication company "B".

The electronic device 601 can display sending menus 603 and 605 capable of sending using the respective SIM cards.

According to various embodiments, the electronic device 601 can display even service provider information 603-1 and 605-1 of the respective SIM cards in the sending menus 603 and 605 capable of sending using the respective SIM cards.

As illustrated in FIG. 6A, the electronic device 601 can display the sending menu 603 capable of sending through the SIM card supporting the communication company "A" and the sending menu 605 capable of sending through the SIM card supporting the communication company "B".

According to various embodiments, as illustrated in FIG. 6B, in a situation in which a sender inputs contact information 611 of a receiver in order to send a call, a message, and the like to the receiver, the electronic device can display the contact information 611 and service provider information 613 of the contact information 611, together.

According to various embodiments, when a SIM card using the same service provider as a service provider corresponding to the displayed contact information 611 has been installed in the electronic device, the electronic device can display information 617 notifying that the SIM card using the same service provider as the service provider used by the receiver exists.

FIG. 6B illustrates a situation in which the receiver uses service provided through the communication company "A" displayed around the contact information 611 of the receiver, and a sending menu 615 adds the information 617 notifying that the SIM card corresponding to the communication company "A" of the receiver has been installed in the electronic device.

According to various embodiments, as illustrated in FIG. 6C, in a situation 621 of displaying contact information of a sender, as receiving a call, a message, and the like from the sender, the electronic device can display service provider information 623 of the displayed contact information.

FIG. 6C illustrates a situation of displaying information notifying that the sender is sending through the communication company "A", around the contact information of the sender who has sent a call.

According to various embodiments, as illustrated in FIG. 6D, in a situation 631 of executing a contact function and displaying contact information, the electronic device can display service provider information 633 of the displayed contact information.

FIG. 6D illustrates a situation in which the electronic device displays contact information of a user "Andrew" among stored user contacts.

Referring to FIG. 6D, it can be confirmed that two phone numbers of the user "Andrew" are stored in the electronic device. The one phone number "111-111-1111" is a phone number using service provided through the communication company "A", and the other phone number "222-222-2222" is a phone number using service provided through the communication company "B".

According to various embodiments, as illustrated in FIG. 6E, in a situation of displaying history information of recent sending/receiving phone numbers, the electronic device can display service provider information 641 of displayed contact information.

Referring to FIG. 6E, it can be confirmed that recently contacting "Daddy" uses service provided through a communication company "C", and "Andrew" uses service provided through the communication company "A".

Figure 7B:
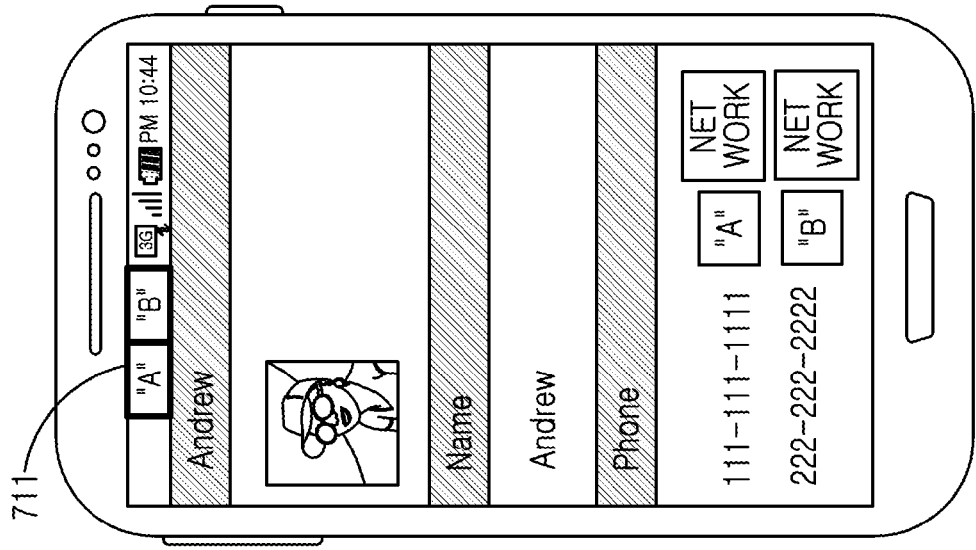
FIGS. 7A and 7B are diagrams illustrating a situation of displaying contact information in an electronic device according to an embodiment of the present disclosure.
Figure 7A:
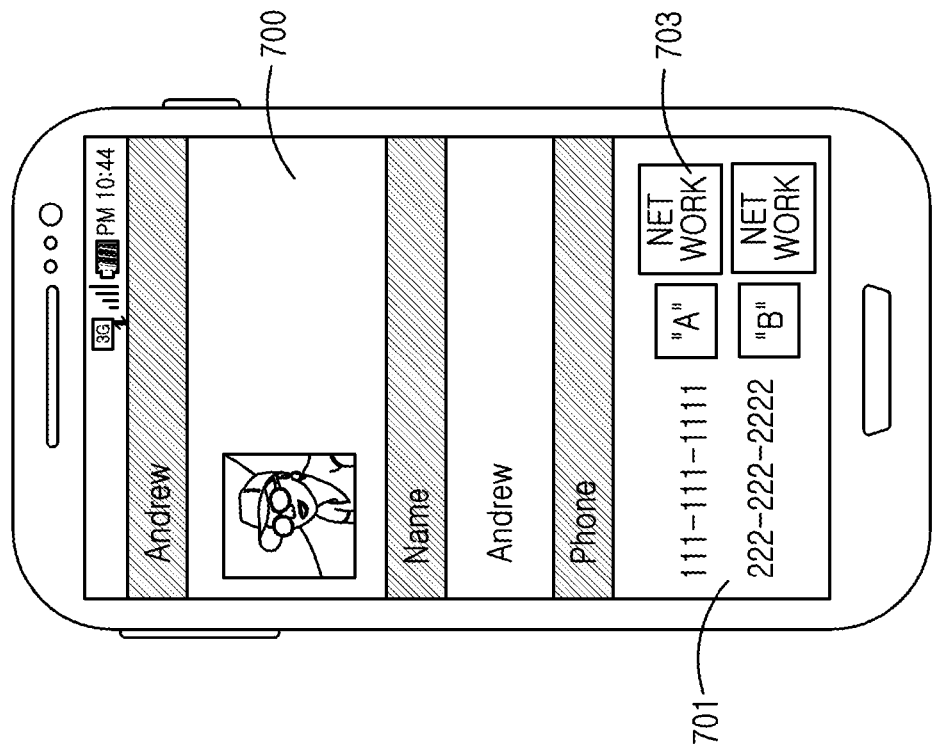

FIGS. 7A and 7B are diagrams illustrating a situation of displaying contact information in an electronic device according to an embodiment of the present disclosure.

Referring to FIG. 7, when a contact function is executed, the electronic device can display contact information including a phone number, a name, and the like of at least one user.

According to various embodiments, the electronic device can display contact information including a phone number, a name, and the like of a counterpart user input by a user in order to send a call, a message, and the like to the counterpart user.

According to various embodiments, as receiving a call, a message, or the like, the electronic device can display contact information including a phone number, a name, and the like of a sender who has sent the call, the message, or the like.

According to various embodiments, the electronic device can display, on a screen, contact information including a receiving/sending phone number, a name, and the like as recent history information about a call, a message, and the like.

According to various embodiments, when displaying contact information, the electronic device can display even information of a service provider providing service to the contact information.

When displaying the contact information as above, the electronic device can display network information corresponding to the contact information together.

Here, the network information can be information of a communication network providing service to the contact information.

FIG. 7A is a diagram illustrating a situation in which the electronic device executes a contact function.

Referring to FIG. 7A, a situation in which the electronic device displays contact information 700 of a user "Andrew" among stored user contacts is illustrated. The electronic device can confirm that two phone numbers 701 have been stored for the user "Andrew".

Further, the electronic device can confirm that the one phone number "111-111-1111" among the two phone numbers 701 of the user "Andrew" is a phone number using service provided through a communication company "A", and the other phone number "222-222-2222" is a phone number using service provided through a communication company "B".

According to various embodiments, the electronic device can display network information 703 corresponding to the respective phone numbers of the user "Andrew".

In a case where the phone number "111-111-1111" among the two phone numbers of the user 'Andrew" uses a 4th-generation network, the electronic device can add a name, an icon, a color, and the like, which are defined in the 4th-generation network, to a region displaying network information.

In the illustrated drawing, the electronic device concurrently displays both service provider information and network information for contact information, but the electronic device can display any one of the service provider information and the network information.

According to various embodiments, when contact information is displayed, the electronic device can display service provider information or network information supported by itself on a partial screen.

According to various embodiments, as illustrated in FIG. 7B, the electronic device can display the service provider information or network information in a region 711 displaying time and battery information.

The illustrated drawing represents a situation of displaying information notifying that the electronic device is providing service using service providers "A" and "B".

Undoubtedly, the electronic device can display the network information in place of the service provider information or can concurrently display both the service provider information and the network information.

FIGS. 8A to 8D are diagrams illustrating a process of sending by an electronic device according to an embodiment of the present disclosure.

According to various embodiments of the present disclosure, the electronic device can support a plurality of SIM cards. That is, the electronic device can send a call, a message, and the like through a service provider corresponding to a SIM card in a state in which at least two or more SIM cards have been installed in the electronic device.

Figure 8A:
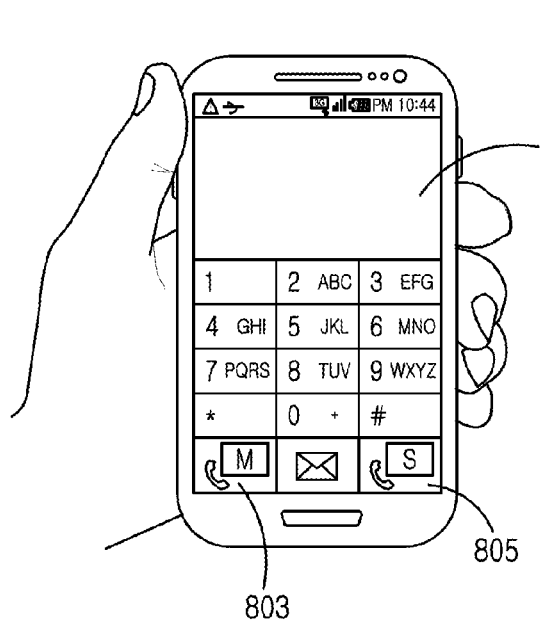
FIGS. 8A, 8B, 8C, and 8D are diagrams illustrating a process of sending by an electronic device according to an embodiment of the present disclosure.

Referring to FIG. 8A, two SIM cards have been installed in an electronic device 801, and the installed two SIM cards can be defined as a Master SIM card (M) and a Slave SIM card (S), respectively.

Further, as illustrated, the electronic device 801 can display a sending menu 803 capable of sending using the master SIM card and a sending menu 805 capable of sending using the slave SIM card. Below, a description can be made assuming that the master SIM card (M) is a SIM card providing service of a service provider "A", and the slave SIM card (S) is a SIM card providing service of a service provider "C".

Figure 8B:
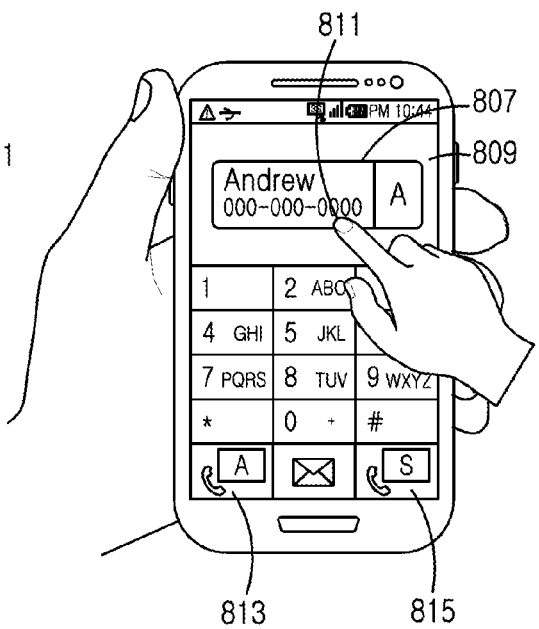

According to various embodiments, if contact information 807 of a receiver is input, as illustrated in FIG. 8B, the electronic device can display information 809 of a service provider used by the receiver, together with the contact information 807 of the receiver.

According to various embodiments, the electronic device can display information notifying that a SIM card using the same service provider the service provider used by the receiver has been installed in the electronic device.

FIG. 8B illustrates that a receiver "Andrew" uses a service provider "A", and the master SIM card among the two SIM cards installed in the electronic device is a SIM card 813 providing service of the service provider "A", and the slave SIM card is a SIM card 815 not matching with contact information.

As the service provider "A" of the master SIM card 813 and the service provider "A" of the receiver "Andrew" are the same as each other, the electronic device can display service provider information in a sending menu of the master SIM card 813. At this time, the electronic device can apply a name, an icon, a color, and the like capable of distinguishing service providers, to the sending menu of the master SIM card 813. As illustrated in FIG. 8B, an icon "M" denoting the master SIM card 813 can be changed into an icon "A" matching with the service provider "A" of the receiver "Andrew".

Figure 8C:
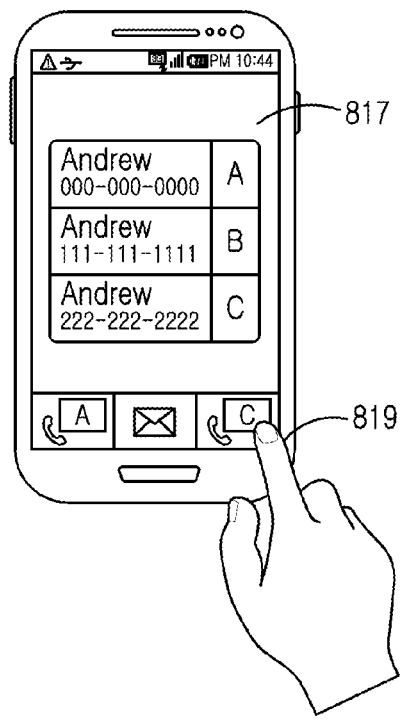

According to various embodiments, if sensing a user's gesture 811 for confirming the contact information 807 of the receiver "Andrew" as illustrated in FIG. 8B, the electronic device can display (817) stored contact information of the receiver "Andrew" in more detail as in FIG. 8C.

Referring to FIG. 8C, the electronic device can confirm that three phone numbers have been stored for the receiver "Andrew".

As in FIG. 8C, the electronic device can display even service provider information together with phone numbers of the receiver "Andrew".

According to various embodiments, as illustrated in FIG. 8C, the electronic device can confirm that the receiver "Andrew" is using three phone numbers corresponding to service providers "A", "B", and "C".

At this time, the electronic device can display information notifying that SIM cards of the same service providers as the service providers of the receiver "Andrew" have been installed in the electronic device.

According to various embodiments, the electronic device can display information of the service providers of the receiver "Andrew", in the sending menus capable of sending through the respective SIM cards matching with the same service providers as the service providers of the receiver "Andrew".

According to various embodiments, if sensing a user's gesture 819 for sending, the electronic device can perform a sending function through a service provider corresponding to the user's input.

Figure 8D:
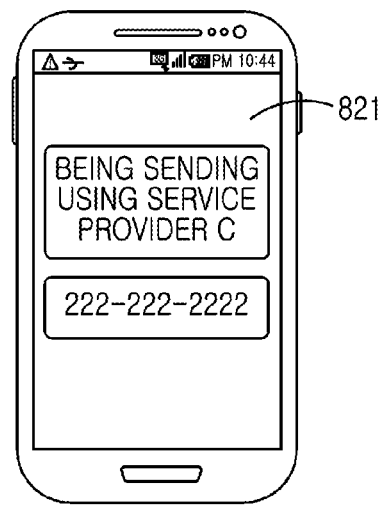

For one example, if sensing a user's input of selecting a sending menu matching with the service provider "C" of the receiver "Andrew" as illustrated in FIG. 8C, the electronic device can send a call, a message, and the like using the slave SIM card corresponding to the service provider "C" as illustrated in FIG. 8D. At this time, the electronic device can attempt (821) to send using the phone number "222-222-2222".

According to various embodiments, if sensing a users' input of selecting a sending menu matching with the service provider "A" of the receiver "Andrew", the electronic device can send a call, a message, and the like using the master SIM card corresponding to the service provider "A". At this time, the electronic device can attempt to send using the phone number "000-000-0000".

According to various embodiments, when sensing a user's input of selecting displayed contact information or service provider information other than the sending menu, the electronic device can attempt to send.

According to various embodiments, if sensing a user's input of selecting information of the service provider "B", the electronic device can attempt to send using the phone number "111-111-1111". At this time, as a SIM card corresponding to the service provider "B" has not been installed in the electronic device, the electronic device can attempt to send using the master SIM card.

FIGS. 9A to 9C are diagrams illustrating a process of sending by an electronic device according to an embodiment of the present disclosure.

According to various embodiments of the present disclosure, the electronic device can support a plurality of SIM cards. That is, the electronic device can send a call, a message, and the like through a service provider corresponding to a SIM card in a state in which at least two or more SIM cards have been installed in the electronic device.

Referring to FIG. 9A, two SIM cards have been installed in an electronic device 901, and the installed two SIM cards can be defined as a Master SIM card (M) and a Slave SIM card (S), respectively.

Further, as illustrated, the electronic device 901 can display a sending menu 903 capable of sending using the master SIM card and a sending menu 905 capable of sending using the slave SIM card.

According to various embodiments, if contact information 907 of a receiver is input, as illustrated in FIG. 9B, the electronic device can display information 909 of a service provider used by the receiver, together with the contact information 907 of the receiver.

FIG. 9B illustrates a situation in which a receiver "Andrew" is using a service provider "A".

If sensing a user's gesture 909 of selecting service provider information corresponding to contact information as illustrated in FIG. 9B, the electronic device can send (911) a call, a message, and the like using a SIM card corresponding to the same service provider as the service provider "A" used by the receiver "Andrew" as illustrated in FIG. 9C.

According to various embodiments, a method for displaying the contact information in an electronic device can include an operation of confirming service provider information corresponding to the displayed contact information and an operation of displaying the confirmed service provider information together with the contact information.

According to various embodiments, the method for displaying the contact information in the electronic device can include an operation of, if an input for the displayed service provider information is sensed, attempting to send using a SIM card matching with the input service provider information.

According to various embodiments, the operation of displaying the confirmed service provider information together with the contact information can include an operation of adding the confirmed service provider information to a sending menu for the SIM card matching with the confirmed service provider information.

According to various embodiments, the operation of displaying the confirmed service provider information together with the contact information can include an operation of applying an effect to information about the SIM card matching with the confirmed service provider information.

According to various embodiments, the operation of displaying the service provider information corresponding to the displayed contact information includes an operation of confirming the service provider information corresponding to the displayed contact information by confirming pre-stored service provider information per contact information. The service provider information per contact information can be provided from a server managing service provider information or be input from a user.

According to various embodiments, a method for displaying the contact information in the electronic device can include an operation of confirming and displaying network information corresponding to the displayed contact information.

According to various embodiments, the method for displaying the contact information in the electronic device can include an operation of, if an input for the displayed network information is sensed, attempting to send using a SIM card matching with the input network information.

According to various embodiments, the method for displaying the contact information in the electronic device can include an operation of adding the confirmed network information to a sending menu for the SIM card matching with the confirmed network information.

When displaying contact information, the electronic device displays service provider information or network information corresponding to the contact information, thereby being capable of connecting with a counterpart user through the same service provider or network.

Each of the aforementioned constituent elements of the electronic device according to the present disclosure can be composed of one or more components, and a name of the corresponding constituent element can be different according to the kind of the electronic device. The electronic device according to the present disclosure can include at least one of the aforementioned constituent elements, and can omit some constituent elements or additionally include other constituent elements. Also, some of the constituent elements of the electronic device according to the present disclosure can be combined and constructed as one entity and perform the same function as the functions of the corresponding constituent elements before combination.

The constituent element used in the present disclosure can represent a unit including a combination of one or more of hardware, software, and firmware, for example. The constituent element can be used interchangeably with the term of unit, logic, logical block, component, circuit or the like.

According to various embodiments, at least some apparatuses (e.g., modules or functions thereof) or methods (e.g., operations) according to the present disclosure can be implemented by an instruction stored in a computer-readable storage media in a form of a programming module, for example. If the instruction is executed by one or more processors (e.g., the processor 120), the one or more processors can perform a function corresponding to the instruction. The computer-readable storage media can be the memory 110, for instance. At least some of the programming module can be implemented (e.g., executed) by the processor 120, for example. At least some of the programming modules can include a module, a program, a routine, a set of instructions, a process or the like for performing one or more functions, for example.

The computer-readable recording media can include a magnetic media such as a hard disk, a floppy disk, and a magnetic tape, an optical media such as a Compact Disc-Read Only Memory (CD-ROM) and a Digital Versatile Disc (DVD), a Magneto-Optical Media such as a floptical disk, and a hardware device specially configured to store and perform a program instruction (e.g., the programming module) such as a Read Only Memory (ROM), a Random Access Memory (RAM), a flash memory, and the like. Also, the program instruction can include not only a mechanical code such as a code made by a compiler but also a high-level language code capable of being executed by a computer using an interpreter, and the like. The aforementioned hardware device can be constructed to operate as one or more software modules so as to perform an operation of the present disclosure, and vice versa.

The module or programming module according to the present disclosure can include at least one or more of the aforementioned constituent elements, or omit some of the aforementioned constituent elements, or additionally include other constituent elements. Operations carried out by the module, the programming module or the other constituent elements according to the present disclosure can be executed in a sequential, parallel, repeated or heuristic method. Also, some operations can be executed in different order or can be omitted, or other operations can be added.

According to various embodiments, in a storage media storing instructions, the instructions are set to enable at least one processor to perform at least one operation when the instructions are executed by the at least one processor. The at least one operation can include an operation of confirming service provider information corresponding to displayed contact information and an operation of displaying the confirmed service provider information together with the displayed contact information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
   displaying contact information;
   identifying a service provider providing service to the contact information; and
   displaying information of a Subscriber Identity Module (SIM) card corresponding to the service provider among a plurality of SIM cards installed in the electronic device.

2. The method of claim 1, further comprising, if the displayed SIM card information is selected, sending data using the SIM card corresponding to the selected information.

3. The method of claim 1, wherein the displaying of the information of the SIM card corresponding to the service provider comprises adding the SIM card information to a sending menu for a SIM card matching the service provider.

4. The method of claim 1, wherein the displaying of the information of the SIM card corresponding to the service provider comprises applying an effect to information about a SIM card matching the service provider.

5. The method of claim 1, further comprising confirming pre-stored service provider information per contact information, the service provider information per contact information being provided from a server managing the service provider information or being input from a user.

6. The method of claim 1, further comprising displaying network information corresponding to the displayed contact information.

7. The method of claim 5, further comprising, if the displayed network information is selected, sending data using a SIM card matching the selected network information.

8. The method of claim 5, further comprising adding the confirmed network information to a sending menu for a SIM card matching the confirmed network information.

9. The method of claim 2, wherein if the displayed SIM card information is selected comprises:
   displaying a call sending menu matching the confirmed service provider information; and
   determining if a menu item for sending a call is selected.

10. An apparatus for displaying contact information in an electronic device, the apparatus comprising:
    at least one processor;
    a memory configured to store data and instructions; and
    at least one program stored in the memory and configured to be executable by the at least one processor,
    wherein the at least one program comprises one or more instructions for processing to:
       display contact information;
       identify a service provider providing service to the contact information; and
       display information of a Subscriber Identity Module (SIM) card corresponding to the service provider among a plurality of SIM cards installed in the electronic device.

11. The apparatus of claim 10, wherein the at least one program further comprises one or more instructions for, if the displayed SIM card information is selected, processing to send data using the SIM card corresponding to the selected information.

12. The apparatus of claim 10, wherein the at least one program comprises one or more instructions for processing to add the SIM card information to a sending menu for a SIM card matching the service provider.

13. The apparatus of claim 10, wherein the at least one program comprises one or more instructions for processing to apply an effect to information about a SIM card matching the service provider.

14. The apparatus of claim 10, wherein the at least one program further comprises one or more instructions for processing to:
    confirm pre-stored service provider information per contact information, and receive the service provider information per contact information from a server managing the service provider information or to receive the service provider information per contact information from a user.

15. The apparatus of claim 10, wherein the at least one program comprises one or more instructions for processing to display network information corresponding to the displayed contact information.

16. The apparatus of claim 14, wherein the at least one program comprises one or more instructions for, if the displayed network information is selected, processing to send the data using a SIM card matching the selected network information.

17. The apparatus of claim 14, wherein the at least one program comprises one or more instructions for processing to add the confirmed network information to a sending menu for a SIM card matching the confirmed network information.

18. The apparatus of claim 10, wherein the at least one program further comprises one or more instructions to:
   display a call sending menu matching the confirmed service provider information, and
   determine if a menu item for sending a call is selected.

19. A non-transitory computer-readable recording media recording a program for executing the method of claim 1.

\* \* \* \* \*